United States Patent
Fabrykowski et al.

(10) Patent No.: US 8,385,711 B2
(45) Date of Patent: Feb. 26, 2013

(54) MULTI-CONFIGURABLE SPLICE HOLDER

(75) Inventors: Grzegorz Fabrykowski, Gmina Strykow (PL); William J. Giraud, Azle, TX (US); Michael H. Rasmussen, Keller, TX (US); Diana Rodriguez, Fort Worth, TX (US); Michal Ruda, Lodz (PL)

(73) Assignee: Corning Cable Systems LLC, Hickory, NC (US)

( * ) Notice: Subject to any disclaimer, the term of this patent is extended or adjusted under 35 U.S.C. 154(b) by 280 days.

(21) Appl. No.: 12/956,509

(22) Filed: Nov. 30, 2010

(65) Prior Publication Data

US 2011/0268415 A1    Nov. 3, 2011

Related U.S. Application Data

(60) Provisional application No. 61/330,172, filed on Apr. 30, 2010.

(51) Int. Cl.
*G02B 6/00* (2006.01)
(52) U.S. Cl. ......... 385/135; 385/134; 385/136; 385/137
(58) Field of Classification Search .................. 385/134, 385/135, 136, 137, 95, 96, 99
See application file for complete search history.

(56) References Cited

U.S. PATENT DOCUMENTS

| | | | |
|---|---|---|---|
| 5,067,784 A | 11/1991 | Debortoli et al. | 385/53 |
| 5,071,211 A | 12/1991 | Debortoli et al. | 385/76 |
| 5,138,688 A | 8/1992 | Debortoli | 385/135 |
| 5,167,001 A | 11/1992 | Debortoli et al. | 385/135 |
| 5,285,515 A | 2/1994 | Milanowski et al. | 385/135 |
| 5,363,467 A | 11/1994 | Keith | 385/135 |
| 5,412,751 A | 5/1995 | Siemon et al. | 385/135 |
| 5,519,804 A | 5/1996 | Burek et al. | 385/135 |
| 5,572,617 A | 11/1996 | Bernhardt et al. | 385/135 |
| 5,596,670 A | 1/1997 | Debortoli et al. | 385/135 |
| 5,668,911 A | 9/1997 | Debortoli | 385/135 |
| 5,949,946 A | 9/1999 | Debortoli et al. | 385/134 |
| 5,966,492 A | 10/1999 | Bechamps et al. | 385/135 |
| 6,226,439 B1 | 5/2001 | Daoud | 385/137 |
| 6,259,851 B1 | 7/2001 | Daoud | 385/135 |
| 6,427,045 B1 | 7/2002 | Matthes et al. | 385/135 |
| 6,701,056 B2 | 3/2004 | Burek et al. | 385/137 |
| 6,788,871 B2 | 9/2004 | Taylor | 385/135 |
| 6,801,704 B1 | 10/2004 | Daoud et al. | 385/136 |

(Continued)

FOREIGN PATENT DOCUMENTS

WO    WO96/38752    12/1996

OTHER PUBLICATIONS

European Search Report, Aug. 22, 2011, 8 pages.

*Primary Examiner* — Brian Healy
(74) *Attorney, Agent, or Firm* — Russell S. Magaziner

(57) ABSTRACT

Splice holders for managing and storing splices between optical fibers in fiber optic hardware and equipment are disclosed herein. The splice holder include a base portion and an array of splice holding partitions extending from the base portion. In some embodiments the array of splice holding partitions define a plurality of rows for receiving a respective first splice component along a first direction and a plurality of columns intersecting the plurality of fiber rows for receiving a second splice component along a second direction. Similarly, in some embodiments, selected pairs of splice holding partitions define a column width and selected pairs of splice holding partitions define a row width. Additionally, in some embodiments, the column width is sufficiently greater than the row width to accommodate the second splice component oriented along one of the plurality of columns that could not otherwise be accommodated if oriented along one of the plurality of rows.

23 Claims, 15 Drawing Sheets

U.S. PATENT DOCUMENTS

| | | | |
|---|---|---|---|
| 7,120,347 B2 | 10/2006 | Blackwell et al. | 385/135 |
| 7,239,789 B2 | 7/2007 | Grubish et al. | 385/135 |
| 7,272,291 B2 | 9/2007 | Bayazit et al. | 385/135 |
| 7,274,852 B1 | 9/2007 | Smrha et al. | 385/135 |
| 7,310,471 B2 | 12/2007 | Bayazit et al. | 385/135 |
| 7,421,182 B2 | 9/2008 | Bayazit et al. | 385/135 |
| 7,463,810 B2 | 12/2008 | Bayazit et al. | 385/135 |
| 7,751,674 B2 | 7/2010 | Hill | 385/135 |
| 7,751,675 B2 | 7/2010 | Holmberg et al. | 385/135 |
| 7,764,858 B2 | 7/2010 | Bayazit et al. | 385/135 |
| 7,764,859 B2 | 7/2010 | Krampotich et al. | 385/135 |
| 7,805,044 B2 | 9/2010 | Reagan et al. | 385/135 |
| 2002/0191939 A1 | 12/2002 | Daoud et al. | 385/135 |
| 2007/0280619 A1 | 12/2007 | Conner et al. | 385/135 |
| 2008/0112681 A1 | 5/2008 | Battey et al. | 385/135 |
| 2009/0074371 A1 | 3/2009 | Bayazit et al. | 385/135 |
| 2009/0269016 A1 | 10/2009 | Korampally et al. | 385/129 |
| 2009/0290842 A1 | 11/2009 | Bran de Leon et al. | 385/135 |
| 2009/0304342 A1 | 12/2009 | Adomeit et al. | 385/135 |
| 2009/0324189 A1 | 12/2009 | Hill et al. | 385/135 |
| 2010/0061693 A1 | 3/2010 | Bran de Leon et al. | 385/135 |
| 2010/0142910 A1 | 6/2010 | Hill et al. | 385/135 |
| 2011/0268415 A1* | 11/2011 | Fabrykowski et al. | 385/135 |

* cited by examiner

MULTI-CONFIGURABLE SPLICE HOLDER

CROSS REFERENCE

This application claims priority to U.S. Provisional Ser. No. 61/330,172 filed on Apr. 30, 2010 and entitled "FIBER OPTIC SPICE HOLDER". This application is also related to U.S. application Ser. No. 12/956,446, pending, entitled "Module with adapter Side Entry Opening" and U.S. application Ser. No. 12/956,475, pending, entitled "Multi-Layer Module," both of which were filed on the same day as this application and both of which are incorporated by reference in their entireties.

BACKGROUND

1. Field

The present disclosure generally relates to splice holders and, more specifically, to embodiments of a splice module that may be utilized in a plurality of different configurations.

2. Technical Background

In fiber optic and other cable installations, there is often a desire to splice a field fiber in order to utilize a fiber adapter. As such, a multi-fiber cable may be routed to a splice module. The splice module may be configured to facilitate splicing of a field fiber with an optical fiber (such as a pigtail fiber), as well as store excess slack from the multi-fiber cable. However, oftentimes, the fiber optic cable may become disorganized and/or tangled within the splice module, such that maintenance on the multi-fiber cable and/or splicing connection can become difficult. Additionally, as maintenance is required, oftentimes a splice module is unable to store adequate slack to perform the desired maintenance.

Further, during installation and/or maintenance, a field technician may be uncertain whether the splice module will be utilized for single fiber splicing or mass fusion splicing until the field technician analyzes the cable configuration. As such, the field technician may be forced to carry multiple splice modules and/or splice holders to a site. Similarly, in situations where a splice module connection is to be changed from an individual fiber splice to mass fusion splice, the field technician may be forced to disconnect a current splice module and substitute the current splice module with a splice module that conforms to the new connection.

Similarly, in some scenarios, the splice module may be mounted in a module receiving device, such as a telecommunications rack, or other similar structure, with adapters facing through a front opening of the telecommunications rack. As current splice modules include a back entry opening for passing the multi-fiber cable to the splice module, access to the splice module may be difficult. Additionally, such configurations may be difficult to install and/or maintain due to the field technician being unable to perform the desire procedures within the confined area of the telecommunications rack.

SUMMARY

Splice holders for managing and storing splices between optical fibers in fiber optic hardware and equipment are disclosed herein. The splice holder include a base portion and an array of splice holding partitions extending from the base portion. The array of splice holding partitions define a plurality of fiber rows for receiving a respective fiber splice component along a first direction and a plurality of mass fusion columns intersecting the plurality of fiber rows for receiving a mass fusion splice component along a second direction. Similarly, in some embodiments, selected pairs of splice holding partitions define a mass fusion column width and selected pairs of splice holding partitions define a fiber row width. Additionally, in some embodiments, the mass fusion column width is sufficiently greater than the fiber row width to accommodate the mass fusion splice component oriented along one of the plurality of mass fusion columns that could not otherwise be accommodated if oriented along one of the plurality of fiber rows.

Additional features and advantages will be set forth in the detailed description which follows, and in part will be readily apparent to those skilled in the art from that description or recognized by practicing the embodiments described herein, including the detailed description which follows, the claims, as well as the appended drawings.

BRIEF DESCRIPTION OF THE DRAWINGS

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate various embodiments described herein, and together with the description serve to explain the principles and operations of the claimed subject matter.

DETAILED DESCRIPTION

Figure 1:
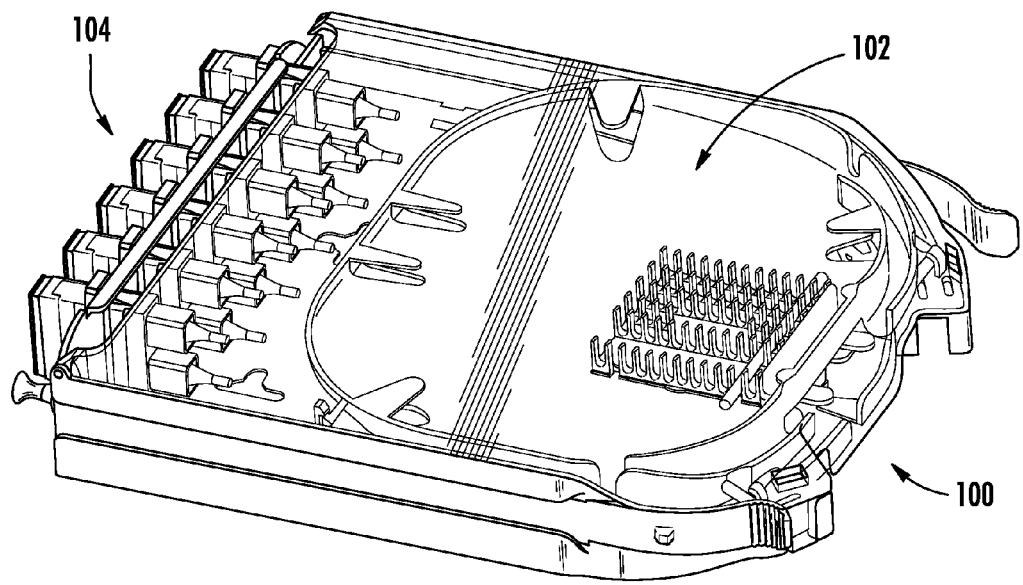
FIG. 1 depicts a multi-layer splice module with a substantially translucent cover in the closed position which allows viewing of internal structure of the module.

Referring initially to the drawings, FIG. 1 depicts a multi-layer module 100, according to embodiments disclosed herein. As illustrated, the multi-layer module 100 includes a housing that is coupled to a hinged cover 102 that is disposed on one of a pair of major faces and an adapter plate 104 that removably couples to the multi-layer module 100 at an adapter opening, where the adapter opening and the adapter plate collectively define an adapter plate area of the module housing. While the cover on the major face provides a closed framework, depending on the particular embodiment, the multi-layer splice module may have an open or closed framework. As illustrated, the hinged cover 102 may be substantially transparent such that a user may view inside the multi-layer module 100 without having to open the hinged cover 102. Additionally, the hinged cover 102 may provide an open position and/or a closed position. In the open position, the hinged cover 102 provides access to the splice storage layer 204. However, in the closed position, the hinged cover 102 covers at least a portion of the splice storage layer 204. Additionally, it should also be understood that for the purposes of describing and defining the present invention, it is noted that the term "substantially transparent" is utilized to refer to a component that allows passage of light there through to provide at least a partial view of components within. Additionally, it should be understood that while the present application discusses the multi-layer module 100, other types of cassettes for storing optical fiber may also be included within the scope of this application.

When fully assembled and installed in the field, adapter plate 104 includes a plurality of adapters that are connected to respective connectors inside the multi-layer module 100, this is merely an example. More specifically, in some embodiments, the connectors may be removed and/or not present. Likewise, the adapter plate 104 can be configured to accommodate any suitable style of adapters such as single fiber adapters (e.g., LC and SC), duplex adapters (e.g., LC), multi-fiber adapters (e.g., MT) and/or adapters that are ganged together.

Figure 2:
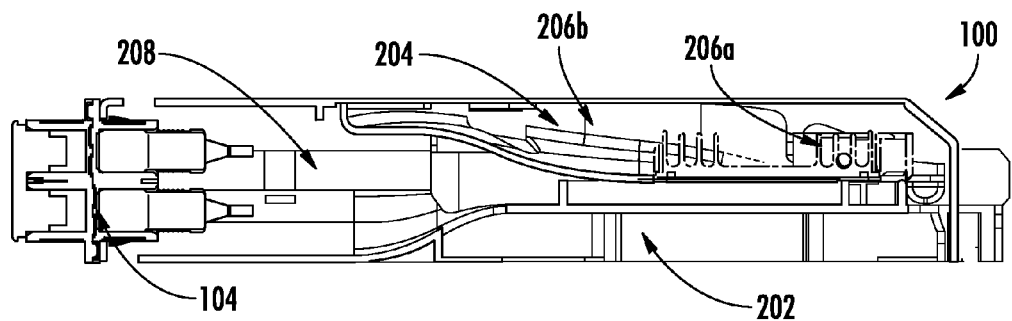
FIG. 2 depicts the multi-layer splice module, further illustrating three layers for routing and storage of an optical cable, such as a multi-fiber cable.

FIG. 2 depicts the multi-layer module 100, further illustrating three layers for storage of an optical cable, such as a multi-fiber cable, according to embodiments disclosed herein. As illustrated, a multi-fiber cable storage layer 202 may be included as part of the multi-layer module 100. Also included is a splice storage layer 204, which includes a splice holder 206a and a slack storage area 206b. The splice storage layer 204 is discrete from the multi-fiber cable storage layer 202. A pigtail storage layer 208 is also included and is arranged so that it is in communication with the backside of an adapter plate 104. The pigtail storage layer is also discrete from both the multi-fiber cable storage layer 202 and the splice storage layer 204. The adapter plate 104 may include one or more adapters that are coupled to one or more respective pigtail fibers, described in more detail, below. As also illustrated, the pigtail storage layer 208 has a thickness at the adapter plate that is equal to the thickness of the multi-layer module 100 as a whole. Additionally, the pigtail storage layer 208 is tapered inward to a reduced layer thickness to accommodate the splice storage layer 204 and the multi-fiber cable storage layer 202 within the thickness of the multi-layer module 100. As illustrated, the layers are arranged in an offset manner, such that a portion of the pigtail storage layer 208 resides within the intervening space between (i.e., disposed between) the multi-fiber cable storage layer 202 and the splice storage layer 204.

For the purposes of describing and defining the embodiments disclosed, it is noted that a module layer is "discrete from" another module layer when one or more intervening structural members of the module serve to at least partially contain fiber or cable in one of the layers. While the embodiment of FIG. 2 illustrates the multi-layer module 100 with a constant thickness, this is merely an example and other arrangements are possible according to the concepts disclosed. More specifically, in some embodiments, the multi-layered splice module is configured with a varying thickness. As shown in FIG. 2, the pigtail storage layer 208 tapers to a smaller height to accommodate the multi-fiber cable storage layer 202 and the splice storage layer 204 at the bottom and top. Additionally, in some embodiments, the multi-fiber cable storage layer 202 and the splice storage layer 204 do not extend to the adapter plate 104.

Figure 3:
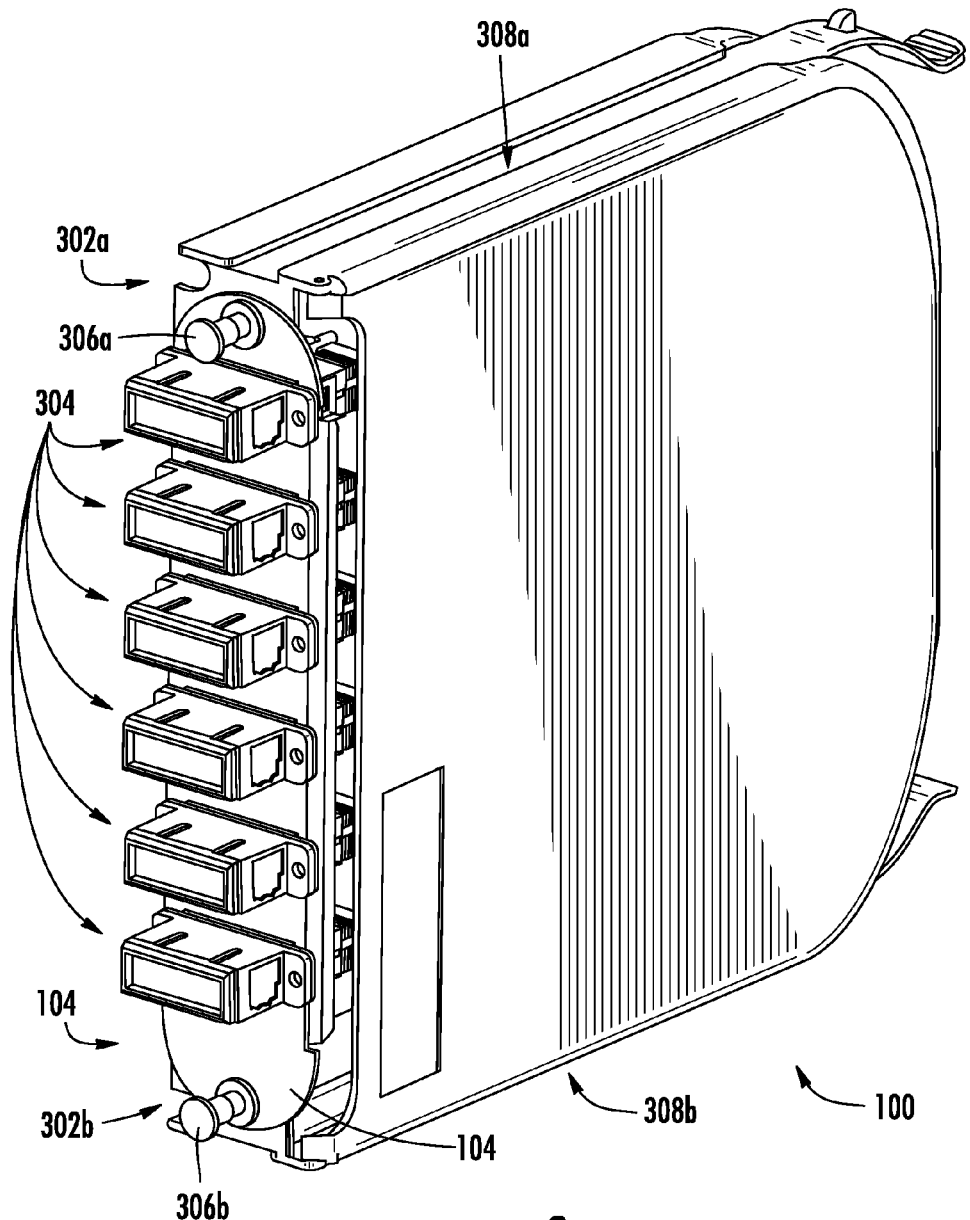
FIG. 3 depicts a front view of the multi-layer splice module showing multi-fiber adapters.

FIG. 3 depicts a front view of the multi-layer module 100, according to embodiments disclose herein. As illustrated, the multi-layer module 100 includes front cable entry openings 302a, 302b for receiving a multi-fiber cable. The front cable entry openings 302a, 302b may have any suitable shape for cable/fiber ingress and/or egress such as generally round, rectangular, oval and/or other suitable shapes. Additionally, in some embodiments, the front cable entry openings 302a, 302b may be disposed on an edge of the adapter side, disposed on the adapter side of the module housing at a housing edge defined at an intersection of one of the pair of major faces of the module housing and the adapter side of the module housing, such that the front cable entry opening includes a partially open periphery for receiving a transversely loaded multi-fiber cable. For the purposes of describing and defining the present invention, it is noted that a "transversely loaded" cable is introduced into a cable opening laterally from a periphery of the opening towards the center of the opening, without the need for threading a free end of the cable through the opening, as opposed to being threaded head first along a center axis of the opening. Additionally, the front cable entry openings 302a, 302b may have a range of dimension to facilitate a frictional connection with the multi-fiber cable.

Also included is the adapter plate 104, which is configured to receive one or more adapters 304. The adapter plate 104 also includes release components 306a, 306b for removing the adapter plate 104 from the multi-layer module 100. The release components 306a, 306b may be configured to interact with corresponding adapter plate openings (see FIG. 4) that reside on the multi-layer module 100. Also included on the multi-layer module 100 are a plurality of mounting tracks that are disposed on respective minor faces of the multi-layer module 100, such as mounting tracks 308a, 308b for mounting the multi-layer module 100, as described in more detail, below.

It should be understood that while the front cable entry openings 302a, 302b are illustrated in the context of a multi-layer cable splice module, this is merely an example. More specifically, the concept of using front cable entry openings 302a, 302b can be implemented on any suitable module for increasing the flexibility of use for the craft. In other words, having front cable entry openings allows the craft to use the module many different mounting arrangements since the cables/fibers can enter the module from different locations, thereby allowing use of the module beyond the typical housing arrangement by the mounting of the module to a wall using fasteners. Additionally, modules having front cable entry openings can also have conventional openings at the rear for cable entry.

Figure 4:
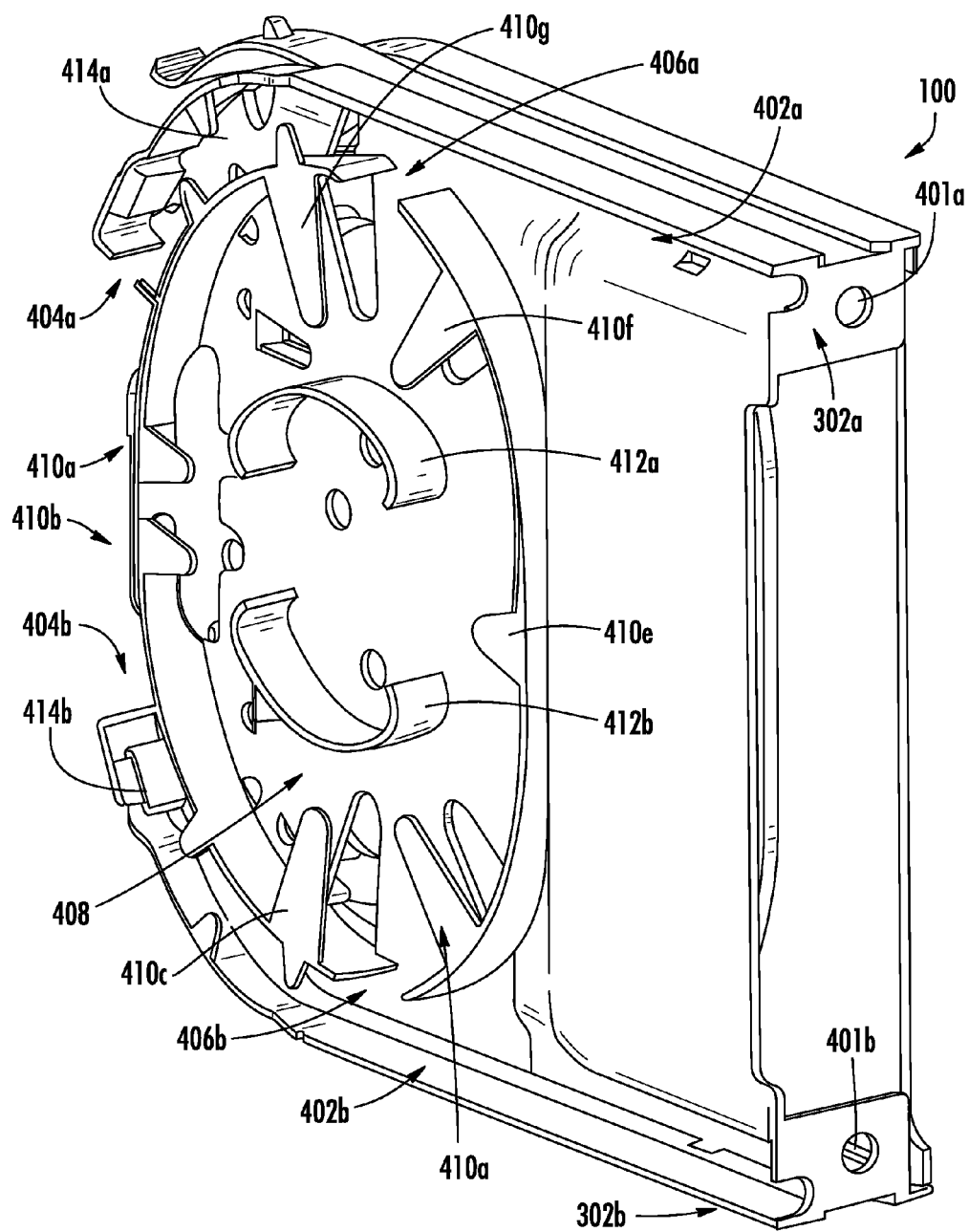
FIG. 4 depicts a perspective view of a portion of the multi-layer splice module.

FIG. 4 depicts a perspective view of another of the pair of the major faces of the multi-layer module 100, according to embodiments disclosed herein. As illustrated, the multi-layer module 100 has an open framework on the major face and includes the adapter plate openings 401a, 401b for receiving and removably securing the adapter plate 104. Also included are front cable trajectories 401a, 402b for receiving a multi-fiber cable from the front cable entry openings 302a, 302b, respectively. From the trajectories, the multi-fiber cable may be routed to receiving openings 406a, 406b. The receiving openings 406a, 406b are in communication with the cable winding structure 408.

Similarly, a multi-fiber cable may be received by the multi-fiber splice module 100 at one or more of the back cable entry openings 404a, 404b. From the back cable entry openings 404a, 404b, the multi-fiber cable may be routed, via a back cable trajectory 414a, 414b to the receiving openings 406a, 406b. Regardless of whether the multi-fiber cable is received at the front cable entry openings 302a, 302b or received at the back cable entry openings 404a, 404b, the cable winding structure 408 may accommodate the multi-fiber cable, which may be wound around a perimeter of the cable winding structure 408. More specifically, the multi-fiber cable may be removably secured by one or more cable securing mechanisms 410a-410g. Additionally, the cable winding structure 408 may include a plurality of cable re-routing walls 412a, 412b. The plurality of cable re-routing walls 412a, 412b may be shaped in a rounded manner to provide a winding radius of the multi-fiber cable. Additionally, between the plurality of cable re-routing walls 412a, 412b, is a re-routing passage to facilitate a change in direction of winding of the multi-fiber cable.

For the purposes of describing and defining the disclosed embodiments, it is noted that the term "perimeter" is utilized to refer to components that are along an outer region of an area. Similarly, for the purposes of describing and defining the disclosed embodiments, it is noted that reference herein to a structural component extending "between" to related components is not utilized herein to require that the component extends from one related component to the other. Rather, the component may merely extend along a portion of a pathway from one component to the other. For example, the adapter side and the back side of the module housing are described herein as extending between the pair of major faces of the module housing, but it is noted that these sides need not span the entire distance between the two faces. While the example of FIG. 4, the multi-fiber cable storage layer 202 has an open framework and thus does not include a cover, this is merely an example. More specifically, in some embodiments, a cover may be included, similar to the hinged cover 102, from FIG. 1.

Figure 5:
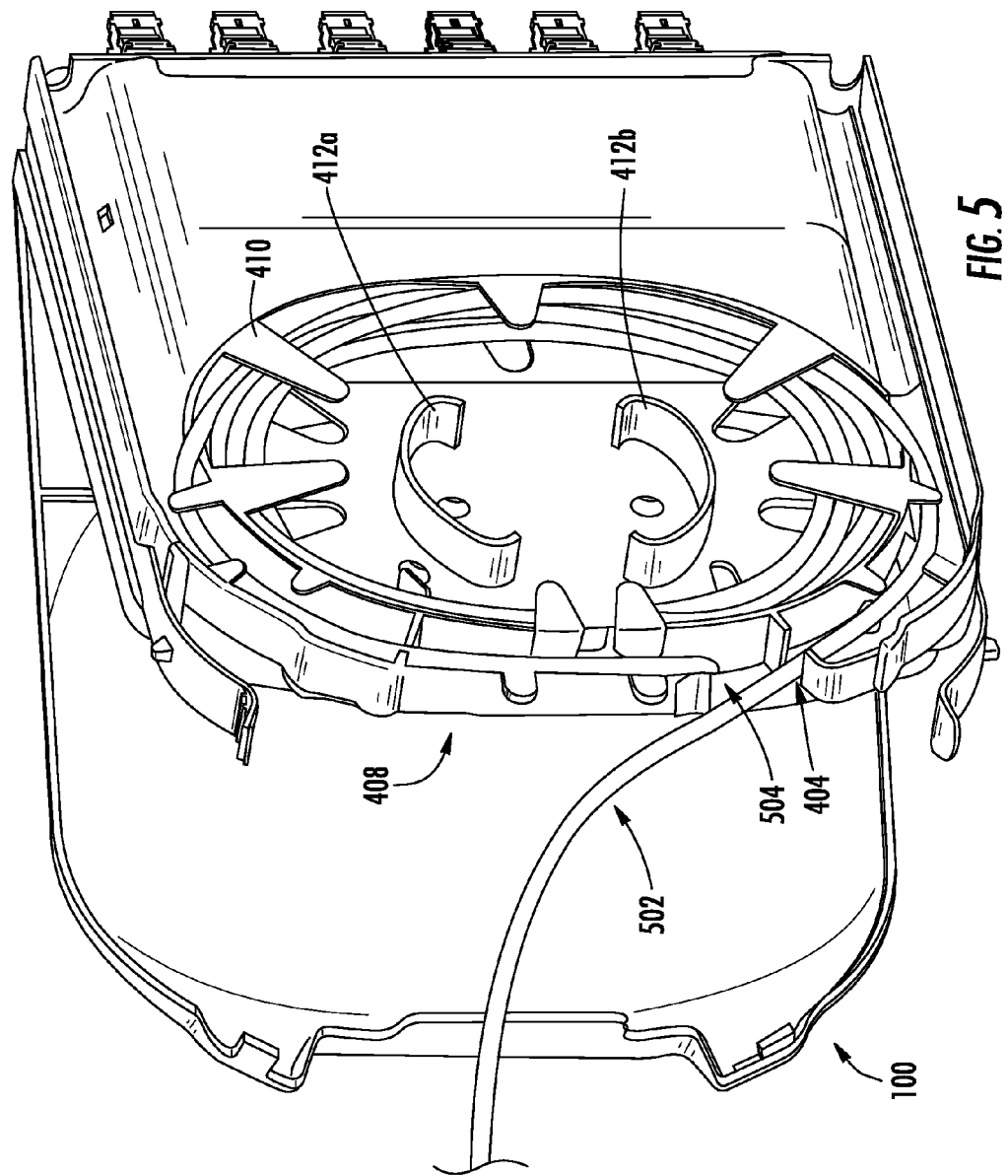
FIG. 5 depicts another perspective view of the multi-fiber cable storage layer, with a multi-fiber cable disposed therein.

FIG. 5 depicts another perspective view of the multi-fiber cable storage layer 202, with a multi-fiber cable 502. As illustrated, the multi-fiber cable 502 is routed to the back cable entry opening 404, through the back cable trajectories 414. From the back cable trajectory 414, the multi-fiber cable 502 may be routed to the cable winding structure 408 and secured by the cable securing mechanisms 410. The multi-fiber cable 502 may be routed and/or re-routed by the cable re-routing walls 412a, 412b and then routed to the splice storage layer 204 (FIG. 2), via a disposing opening 504.

While the front cable trajectories and the back cable trajectories may be any configuration for routing the multi-fiber cable above a minimum bending radius defined by the multi-directional radius-limiting cable winding structure, in some embodiments they may be configured as front multi-fiber cable channels and back multi-fiber cable channels.

Figure 6:
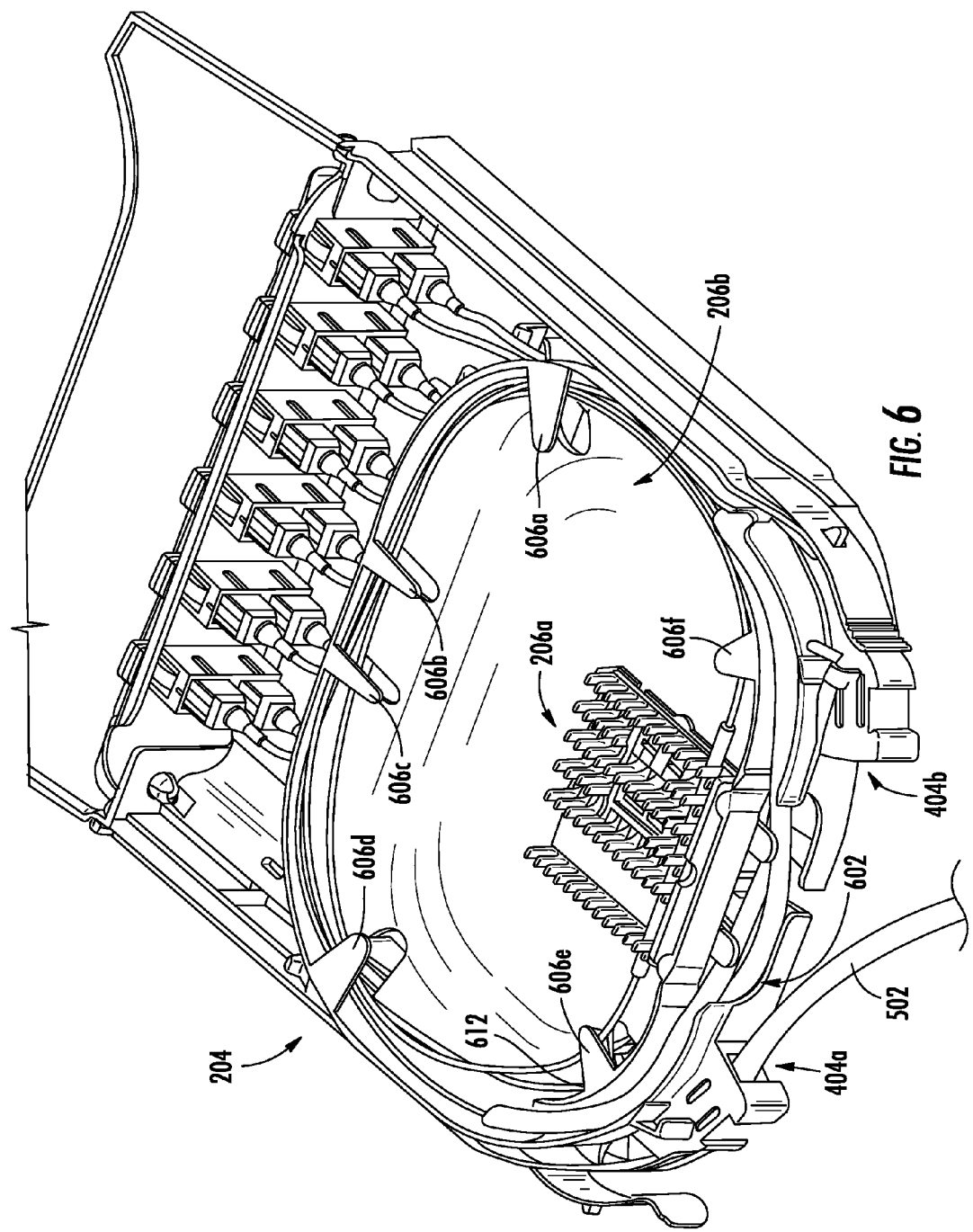
FIG. 6 depicts a perspective view of the splice storage layer with the cover in an open position and showing duplex adapters secured to the adapter plate along a routed cable with a splice.

FIG. 6 depicts a perspective view of the splice storage layer 204, according to embodiments disclosed herein. As illustrated, from the disposing opening 504 (FIG. 5), the multi-fiber cable 502 can be received at a splice layer receiving opening 602. From the splice layer receiving opening 602, the multi-fiber cable 502 can be routed into the slack storage area 206b. More specifically, in some embodiments, the multi-fiber cable 502 may be separated into individual fibers and the individual fibers may be routed along a perimeter of the splice storage layer 204. The individual fibers may be removably secured by one or more splice layer securing mechanisms 606a-606f. The individual fibers may additionally be spliced with an optical fiber cable, such as a pigtail fiber at the splice holder 206a. The optical fiber cable may include one or more optical fibers and may then be routed to a splice layer disposing opening.

In some embodiments, the multi-fiber cable 502 may be stripped into individual fibers for routing, but this is not necessary. By way of example, the multi-fiber cable may be routed to the splice holder 206a without being separated into individual fibers or may be routed in one or more groups of fibers. Splice holder 206a is an explanatory embodiment showing the concept of having an array of splice holding partitions extending form the base portion that define a plurality of rows for receiving a respective first splice component along a first direction and a plurality of columns intersecting the rows for receiving a second splice component along a second direction. Moreover, the column width is sufficiently greater than the row width to accommodate the second splice component oriented along one of the columns that could not otherwise be accommodated if oriented along one of the rows. Although the detail description respectively describes the first and second splice component as a fiber splice component and a mass fusion splice component other the splice holder can be designed for other suitable splice components like mechanical splice components such as cam or crimp splice components by adjusting the row and column widths accordingly.

Figure 7:
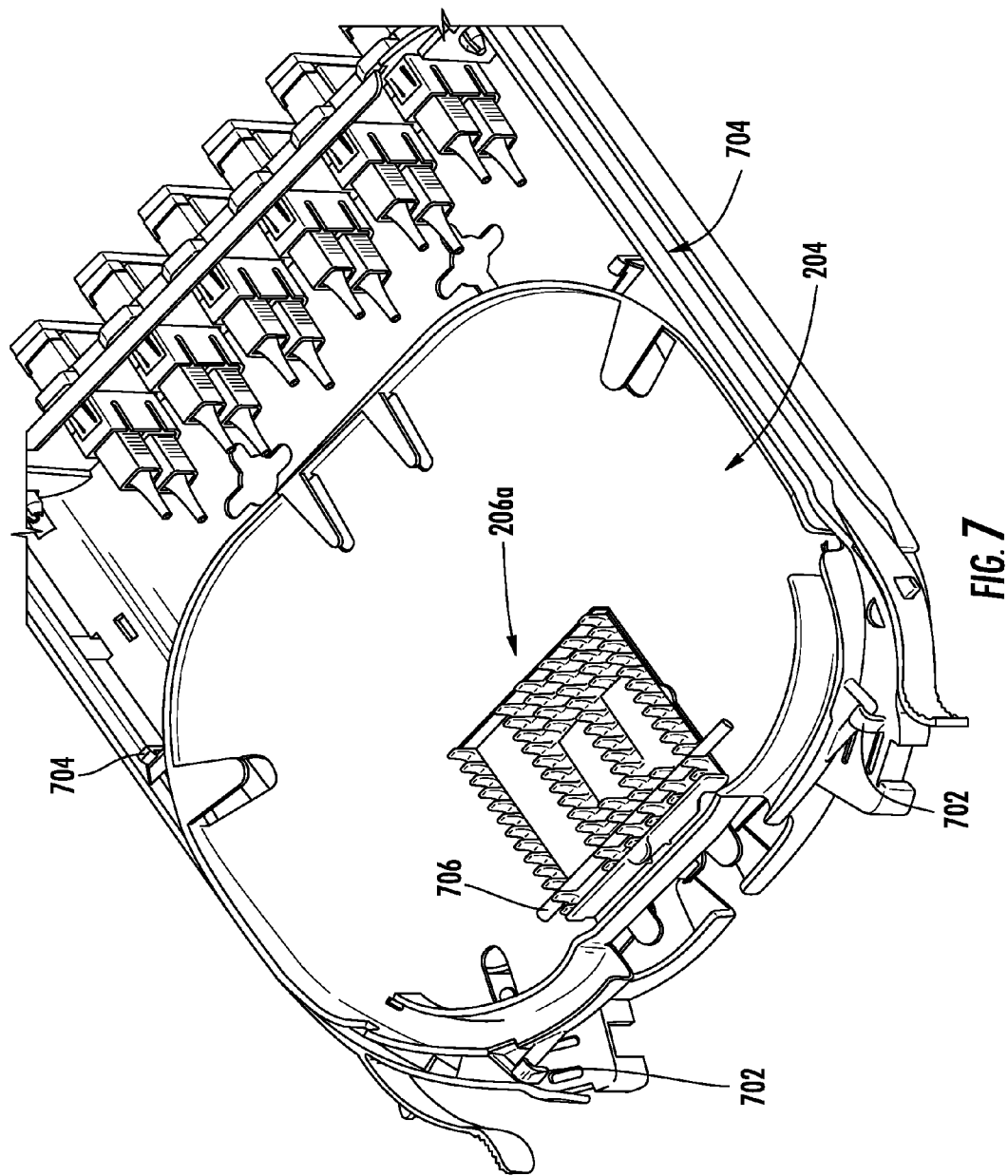
FIG. 7 depicts another perspective view of the splice storage layer with the cable removed.

FIG. 7 depicts another perspective view of the splice storage layer 204, according to embodiments disclosed herein. As illustrated, the splice storage layer 204 can removably secure the splice holder 206a. Depending on the particular embodiment, the splice holder 206a may be configured for removably securing a first splice component such as a fiber splice component 706, a second splice component such as a mass fusion splice component, and/or other similar components, as known in the art. Additionally illustrated in FIG. 7 are splice layer hinges 702 and splice layer latches 704. More specifically, the splice storage layer 204 may be pivotally attached to the multi-layer module 100 and act as a hinged separator to provide access to the pigtail storage layer 208, as described in more detail, below.

Figure 8:
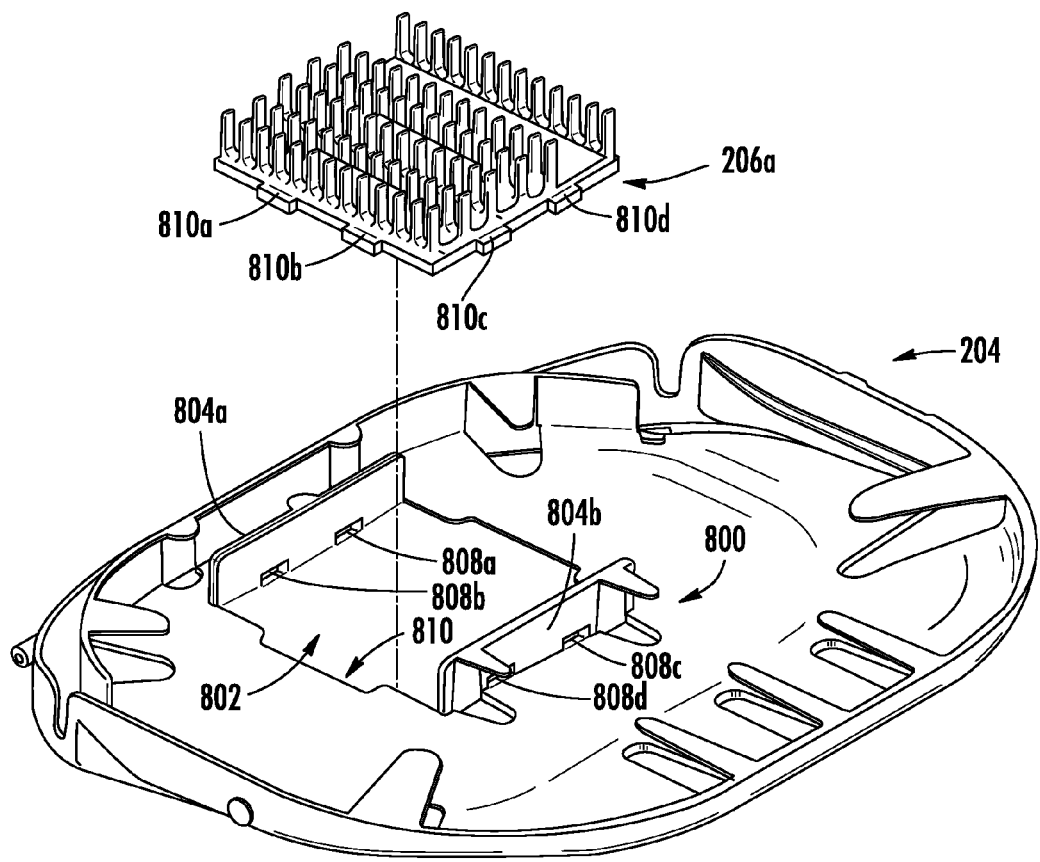
FIG. 8 depicts another partially exploded perspective view of the splice storage layer, further illustrating utilization of the splice holder.
Figure 9:
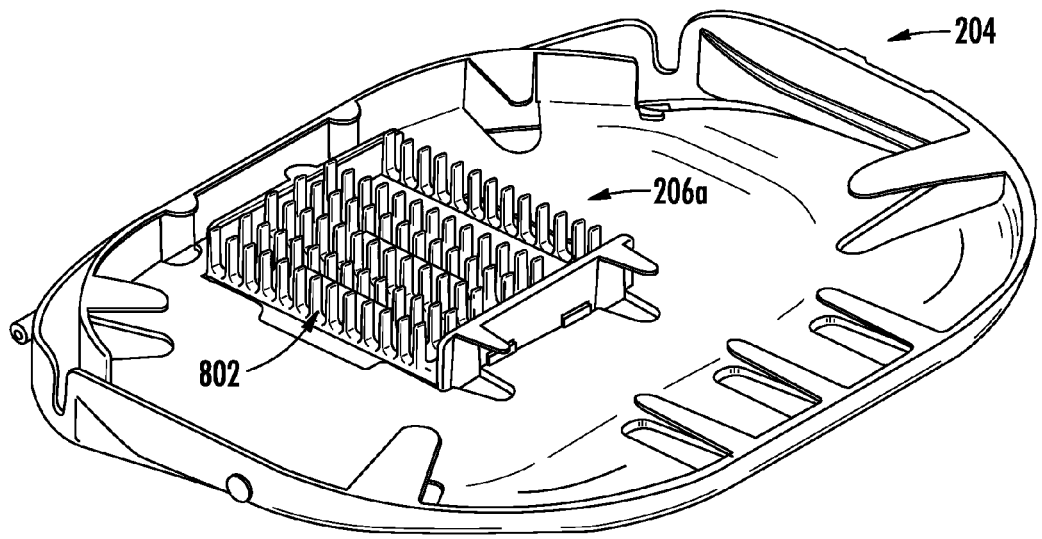
FIG. 9 depicts the splice holder from FIG. 8 residing within the splice holder seat.

FIG. 7 depicts the splice holder 206a being housed in a multi-layer module 100; however, splice holders according to the concepts disclosed herein may be used in other modules or hardware as desired. FIGS. 8 and 9 depict splice holder 206a being secured to the splice module for receiving and splicing multi-fiber cable in an organized fashion.

FIG. 8 depicts another perspective view of the splice storage layer 204, further illustrating utilization of the splice holder 206a. As illustrated, the splice storage layer 204 includes a splice holder seat 800. The splice holder seat 800 may be configured with a splice holder footprint area 802, which may be configured as a depressed area for receiving the splice holder 206a. The splice holder footprint area 802 may be of any shape, but in some embodiments is relatively square in shape with approximately the same dimensions as the splice holder 206a. Accordingly, the splice holder may be inserted into the splice holder footprint area 802 along a first orientation and/or rotated 90 degrees. As discussed in more detail below, this allows the splice holder to secure at least one fiber splice component (FIG. 7) in the first orientation and mass fusion splice components, when rotated 90 degrees to a second orientation.

Splice holder 206a may be have any suitable shape that allows different splice storage arrangements in different directions. By way of example, the splice holder may have shapes such as circular, polygons such pentagonal, hexagonal, heptagonal, octagonal in shape and/or otherwise configured for rotation about a predetermined angle to implement a different type of splice holding configuration. Moreover, the concepts of the splice holder may be used any suitable material such as pliable or rigid materials. Likewise, the splice holder can have any suitable attachment features such as adhesive tapes, sliding structures, clip structures, etc. However, the modules disclosed herein can use any suitable splice holder and associated splice holder seat 800 such as a splice holder that is not configured for rotation and may take any shape that removably secures the splice holder.

Additionally included as part of the splice holder seat is a raised portion, such as raised portions 804a, 804b. The raised portions 804a, 804b may extend from the splice storage layer 204 to at least partially surround the splice holder 206a, when placed in the splice holder seat 800. The raised portions 804a, 804b may additionally include extension receiving mechanisms 808a-808d for engaging with a plurality of extension tabs 810a-810d.

FIG. 9 depicts the splice holder 206a from FIG. 8 residing within the splice holder seat 800. As illustrated, the splice holder 206a may be removably secured within the splice holder seat 800 and may be configured for being secured in a plurality of orientations, such that the splice holder 206a may secure a fiber splice component 706 and/or a mass fusion splice component.

Figure 10A:
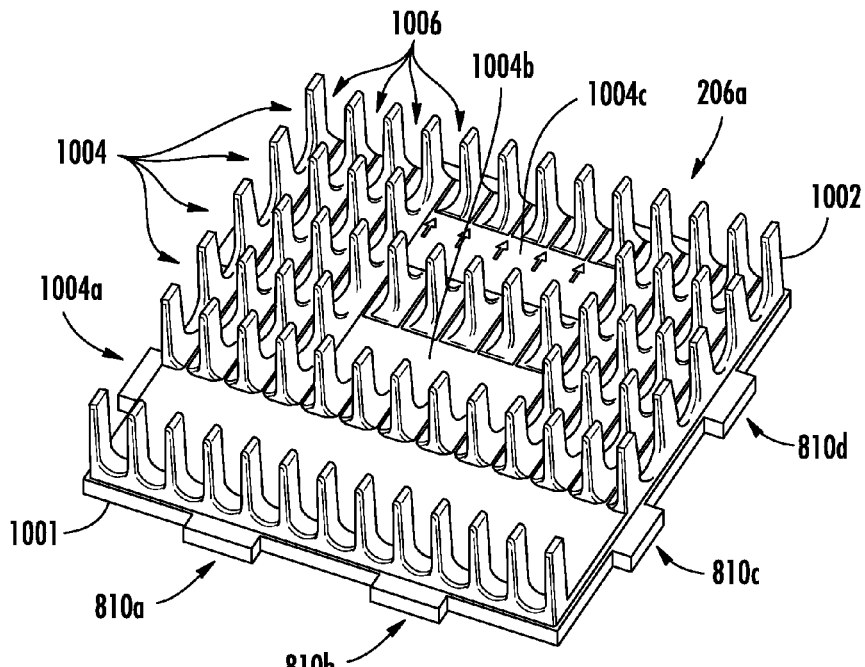
FIG. 10A depicts a perspective view of the splice holder of FIGS. 8 and 9 in more detail.

FIG. 10A depicts a perspective view of the splice holder 206a in more detail. As illustrated, the splice holder 206a may include a base portion 1001, which is coupled to an array splice holding partitions 1002 that extend from the base portion 1001 and are positioned at an intersection of mass fusion columns 1004 and fiber rows 1006. The splice holding partitions 1002 may be shaped such to create the mass fusion columns 1004 and the fiber rows 1006. The fiber rows 1006 are configured to receive and removably secure at least one fiber splice component at a fiber splice component seat that has a first radius of curvature (when round in shape), while the mass fusion columns 1004 are configured to receive and removably secure the larger mass fusion splice components at a mass fusion splice component seat that has a second radius of curvature (when round in shape). As also illustrated, the fiber rows 1006 include a row-forming surface portion that opposes a complementary row-forming surface portion of an adjacent splice holding partition 1002. Similarly, the mass fusion columns 1004 include a column-forming surface portion that opposes a complementary column-forming surface portion of an adjacent splice holding partition 1002.

Also included in the splice holder 206a are a transition box area 1004a and transition box areas 1004b, 1004c. More specifically, the transition box area 1004a may be defined by a subset of the splice holding partitions 1002, where selected pairs of the subset of splice holding partitions include opposing surface portions that define a transition box area width that is larger than the mass fusion column width. The transition box area 1004a may be configured to receive and removably store a ribbon cable that is wider than a mass fusion cable. Thus, the transition box area 1004a may extend the length of the splice holder 206a. Similarly, a subset of the splice holding partitions 1002 may be arranged to define the mass fusion areas 100b, 1004c for receiving and removably securing a transition box. However, while the transition box area 1004a extends the length of the splice holder 206a, the transition box areas 1004b, 1004c may extend a portion of the length of the splice holder 206a. Regardless, in some embodiments, selected pairs of the subset of splice holding partitions 1002 include opposing surface portions that define a transition box area width that is larger than the mass fusion column width.

As also illustrated, a plurality of individual splice holding partitions 1002 can cooperate with the base portion 1001 and adjacent splice holding partitions 1002 to a define splice component seats (e.g., mass fusion splice component seats and fiber splice component seats) that extend from the plurality of individual splice holding partitions across a fiber row and across a mass fusion column. More specifically, as illustrated in FIG. 10A, the component seats may include a basin between adjacent splice holding partitions 1002. In embodiments where the basin is rounded, the component seats define a radius of curvature that complements an outside diameter of the fiber splice component or the mass fusion splice component. While in FIG. 10A, the splice component seats are rounded in shape, other shapes may also be utilized (such as rectangular, triangular, etc.) for removably securing a fiber splice component 706. Similarly, in some embodiments, the adjacent splice holding partitions 1002 may be shaped to create a basin for receiving and removably securing a mass fusion splice component.

Figure 10B:
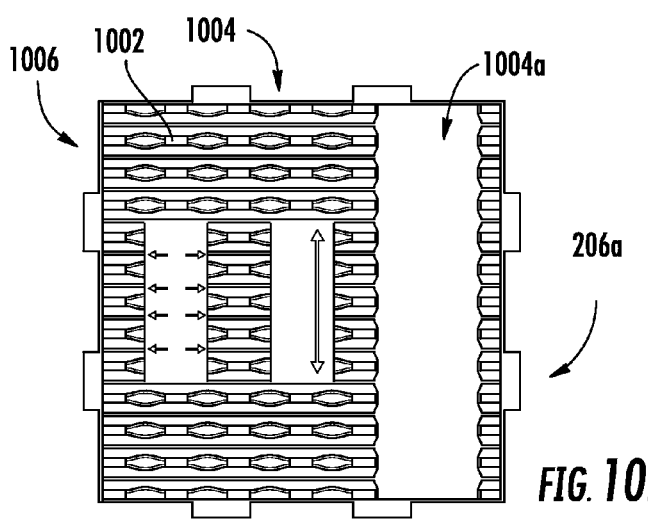
FIG. 10B depicts an overhead view of the splice holder of FIGS. 8 and 9.

FIG. 10B depicts an overhead view of the splice holder 206a, according to embodiments disclosed herein. As illustrated, the splice holding partitions 1002, and thus the mass fusion columns 1004 and the fiber rows 1006, may be shaped to secure fiber splice component 706 and mass fusion splice components, respectively. One mechanism for doing this is clearly illustrated in FIG. 11, which depicts that the fiber rows having a variable fiber row width between each of the splice holding partitions 1002. More specifically, the fiber rows are bowed between the splice holding partitions 1002 to provide a friction connection with a fiber splice component 706.

Figure 10C:
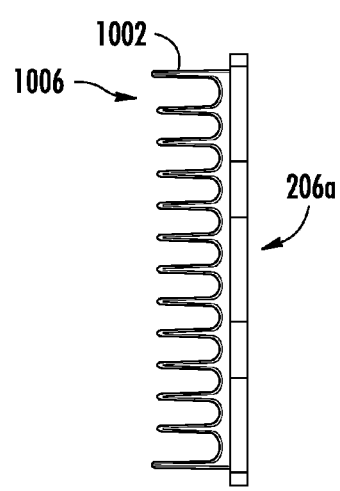
FIG. 10C depicts a side view of the splice holder of FIGS. 8 and 9.

FIG. 10C depicts a side view of the splice holder 206a, further illustrating the fiber rows 1006, according to embodiments disclosed herein. As illustrated, the splice holding partitions 1002 may define the fiber rows 1006 with a rounded basin. Additionally, while the embodiment of FIG. 10C illustrates splice holding partitions 1002 that are substantially parallel, in some embodiments, the splice holding partitions are tapered to further provide a variable fiber row width that is narrower at the base basin than at the entry portion. This further facilitates a friction connection with the fiber splice component 706.

Figure 10D:
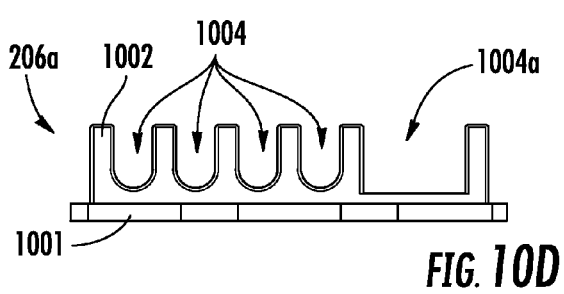
FIG. 10D depicts a side view of the splice holder, further illustrating the mass fusion columns of FIGS. 8 and 9.

FIG. 10D depicts a side view of the splice holder 206a, further illustrating the mass fusion columns 1004, according to embodiments disclosed herein. As illustrated, in some embodiments, the mass fusion columns 1004 may also have a rounded basin. Additionally, in some embodiments, the mass fusion width (which is defined by adjacent splice holding partitions 1002) may be constant, while in some embodiments, splice holding partitions 1002 may be tapered to provide a variable mass fusion column width that is greater at an entry portion at the basin, to further facilitate a friction connection with a mass fusion splice component.

It should be understood that while the exemplary embodiments of FIGS. 10C and 10D illustrate the splice holding partitions as being formed together as a single piece that is coupled to the base portion 1001, this is merely an example. More specifically, in some embodiments, the splice holding partitions 1002 may be individually connected to a base portion 1001.

Figure 10E:
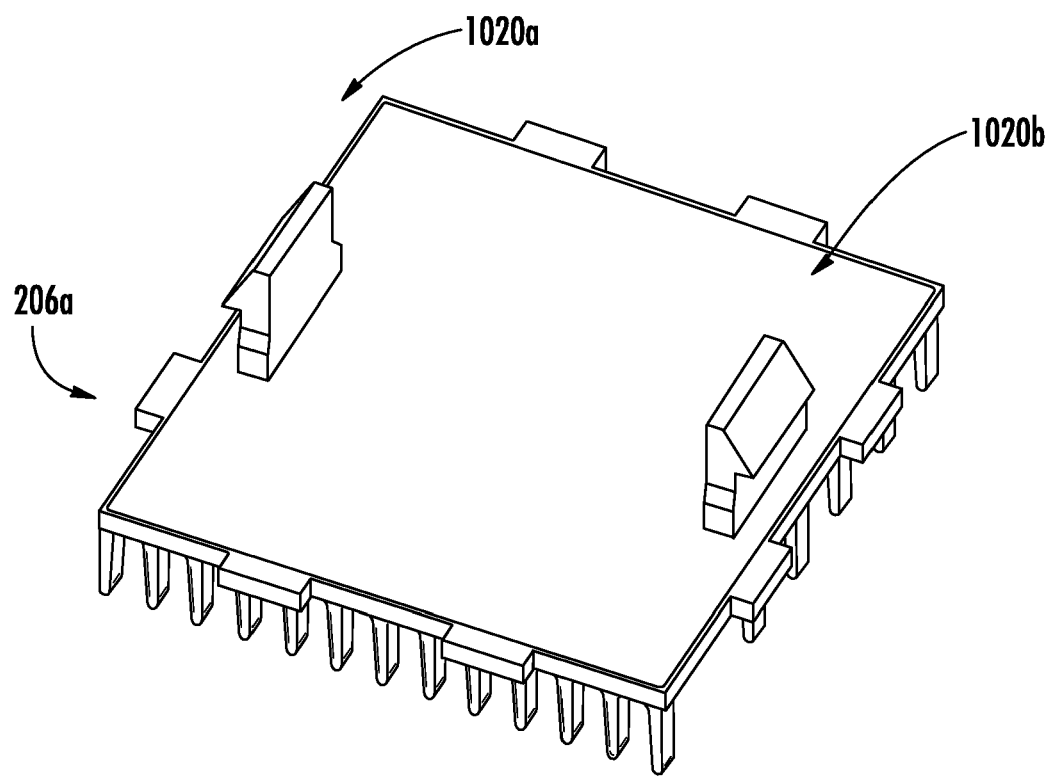
FIG. 10E depicts an underside view of another splice holder further illustrating anchor tabs disposed on the bottom.

FIG. 10E depicts an underside view of a variation of splice holder 206*a*, further illustrating a plurality of anchor tabs 1020*a*, 1020*b* on the bottom. As illustrated, the splice holder 206*a* may include one or more anchor tabs 1020*a*, 1020*b* for removably securing the splice holder 206*a* with the splice storage layer 204. While the anchor tabs 1020*a*, 1020*b* may be configured as illustrated in FIG. 10E, other configurations and/or structures are also contemplated for removably securing the splice holder 206*a* such as sliding structures, pins, holes, fasteners, etc. using the multi-direction concepts disclosed.

In preferred embodiments, the splice holder 206*a* is constructed of a pliable material, such as a pliable rubber material. For the purposes of describing and defining the present invention, it is noted that a "pliable rubber material," as used herein, refers to any material that includes rubber and may be bent without breaking and return to its original configuration quickly and easily.

Additionally, while not explicitly illustrated in FIGS. 10A-10E, the splice holder 206*a* may include a mechanism for further securing a splice component. As an example, in some embodiments, a notch may be formed on at least a portion of the array of splice holding partitions 1002 to prevent a splice component from being inadvertently removed from the splice holder 206*a*. Similarly, some embodiments may include a cover on at least a portion of the splice holder. In still some embodiments, a clip may be attached to adjacent splice holding partitions 1002 to prevent inadvertent removal of a splice component.

Figure 11:
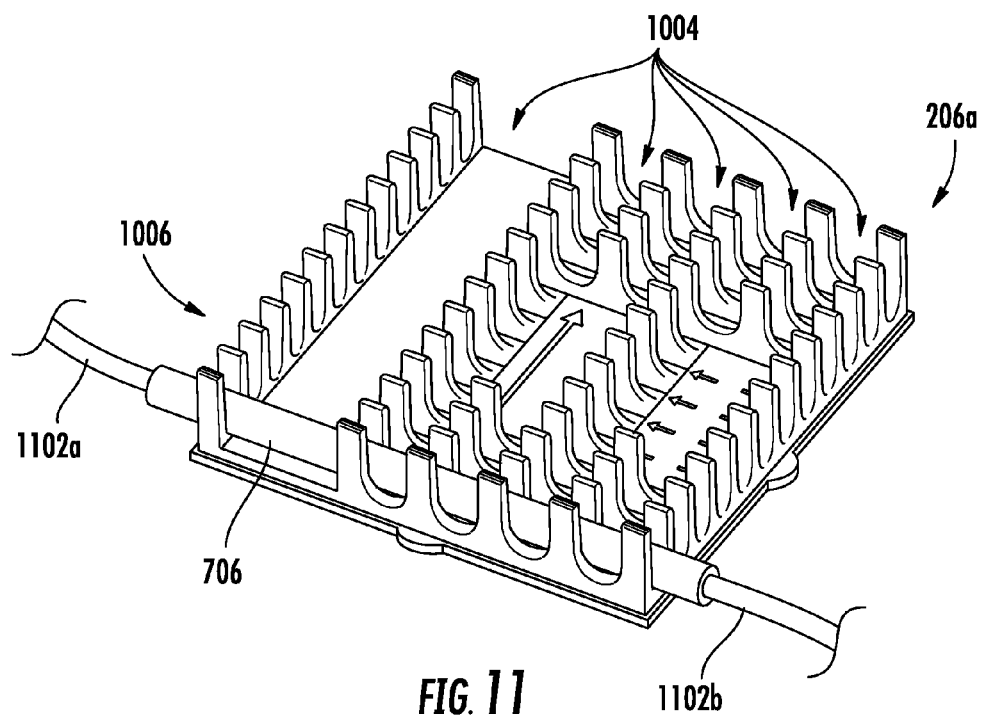
FIG. 11 depicts the splice holder with a fiber splice component disposed therein.

FIG. 11 depicts the splice holder 206*a* with a fiber splice component 706. As illustrated, a fiber 1102*a* from a multi-fiber cable 502 may be routed to a fiber splice component 706, which can facilitate a splice with an optical fiber 1002*b* (such as a pigtail fiber). The fiber splice component 706 may be removably secured to the splice holder 206*a* via a friction connection and oriented across one of the fiber rows 1004. Additionally, in some embodiments, the splice holder 206*a* is structured to receive and secure a second fiber splice component that is stacked on top of the fiber splice component 706. As illustrated in FIG. 11, if the fiber splice component 706 is stacked along a length of the splice holder 206*a*, the second fiber splice component could be stacked along that length on top of the fiber splice component 706.

Figure 12:
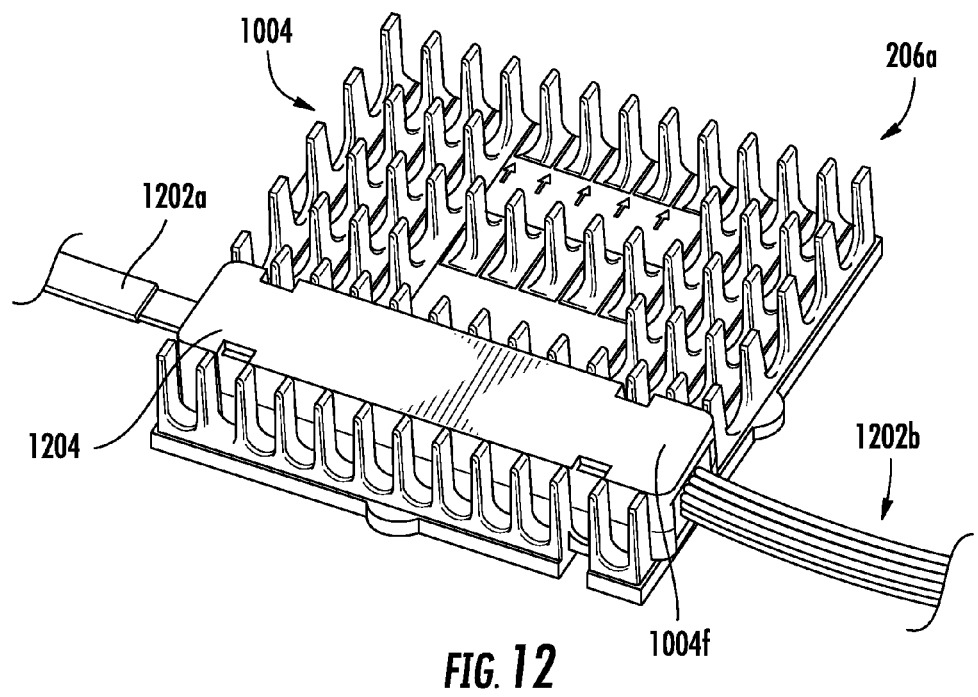
FIG. 12 depicts the splice holder with a ribbon cable box that is inserted into the transition box area of the splice holder.

FIG. 12 depicts the splice holder 206*a* with a ribbon cable box 1204 that is inserted into the transition box area 1004*a*. As illustrated, a ribbon cable 1202*a* is sent to a ribbon cable box 1204 for splicing. Additionally, a plurality of optical fibers 1202*b* is also coupled to the ribbon box 1024. As discussed above, the transition box area 1004*a* may be configured to removably secure the ribbon cable box 1204 via a friction connection.

Figure 13:
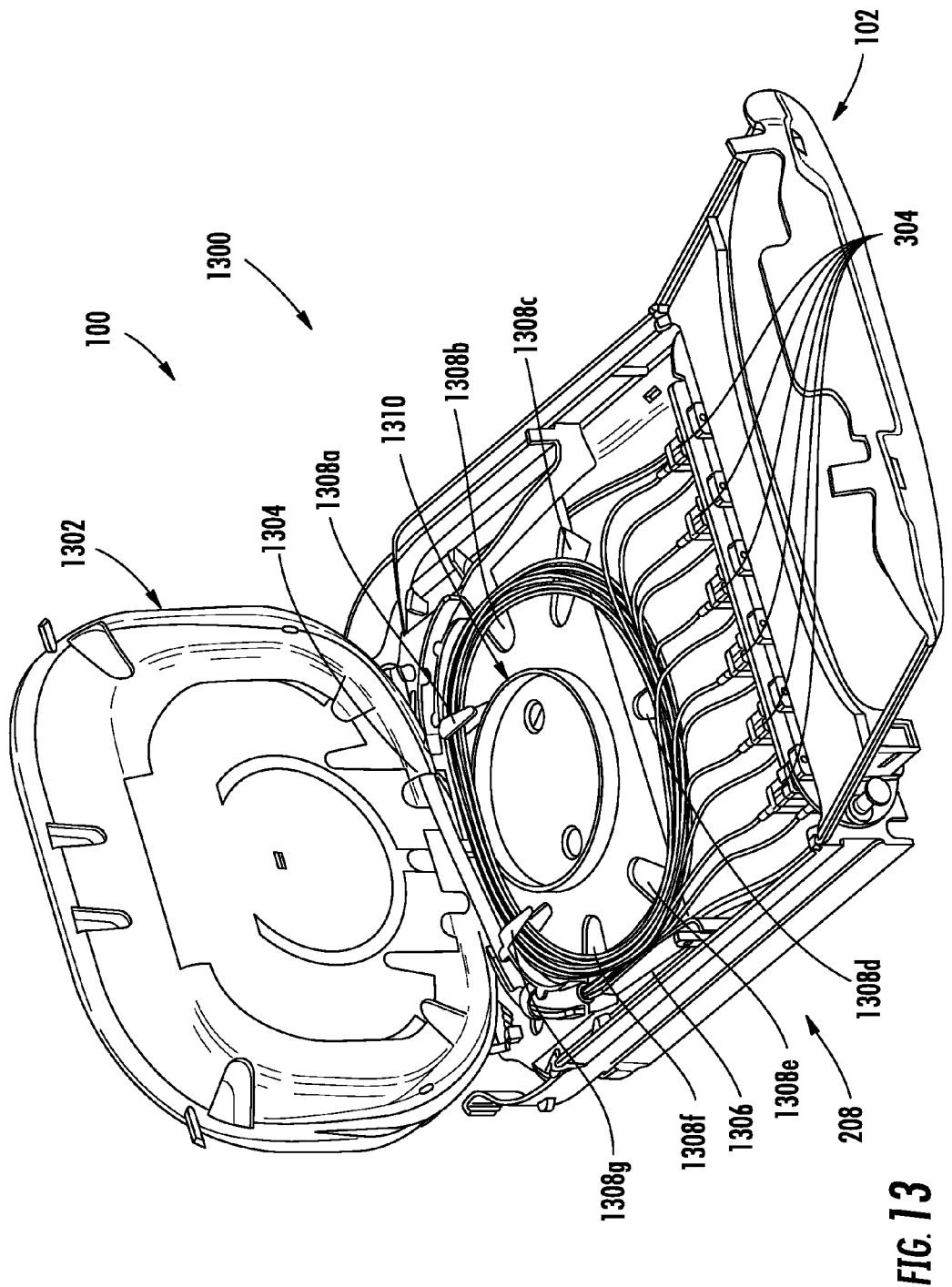
FIG. 13 depicts the multi-layer splice module with the cover and hinged separator in the open positions for further illustrating the pigtail storage layer.

FIG. 13 depicts the multi-layer module 100, further illustrating the pigtail storage layer 208. As illustrated, the optical fiber that was spliced within the splice holder 206*a* (FIGS. 6, 11, and 12) is routed from the splice storage layer 204 to the pigtail storage layer 208 via a pigtail storage receiving opening 1304. From the pigtail storage receiving opening 1304, the optical fibers 1306 can be routed around a radius limiting hub 1310 and removably secured by a plurality of pigtail storage layer securing mechanisms 1308*a*-1308*e*. The optical fibers 1306 may additionally be coupled to the adapters 304.

Additionally included in the example of FIG. 13, is a hinged separator 1302. The hinged separator 1302 may be hinged on an opposite side of the multi-layer module 100 as the hinged cover 102 is hinged and may fit inside the multi-layer module 100 when the hinged cover 102 is closed. Additionally, the hinged separator 1302 may provide an open position to provide access to the pigtail storage layer 208 and a closed position to provide access to the splice storage layer 204. More specifically, the hinged cover 102 may have an opening edge and a pivoting edge, where (as shown in FIG. 13), the opening edge connects with a back side of the multi-layer module 100 and the pivoting edge is positioned toward the adapter side of the multi-layer splice module. Referring back to FIG. 7, in some embodiments, the splice holder 206*a* is positioned toward the opening edge of the hinged cover 102.

Similarly, the hinged separator 1302 includes an opening edge and a pivoting edge that oppose the corresponding parts of the hinged cover 102. More specifically, as illustrated in FIG. 13, the hinged separator 1302 may have a hinged edge toward the back side of the multi-layer module 100 and an opening edge toward the adapter side of the multi-layer module 100.

Figure 14:
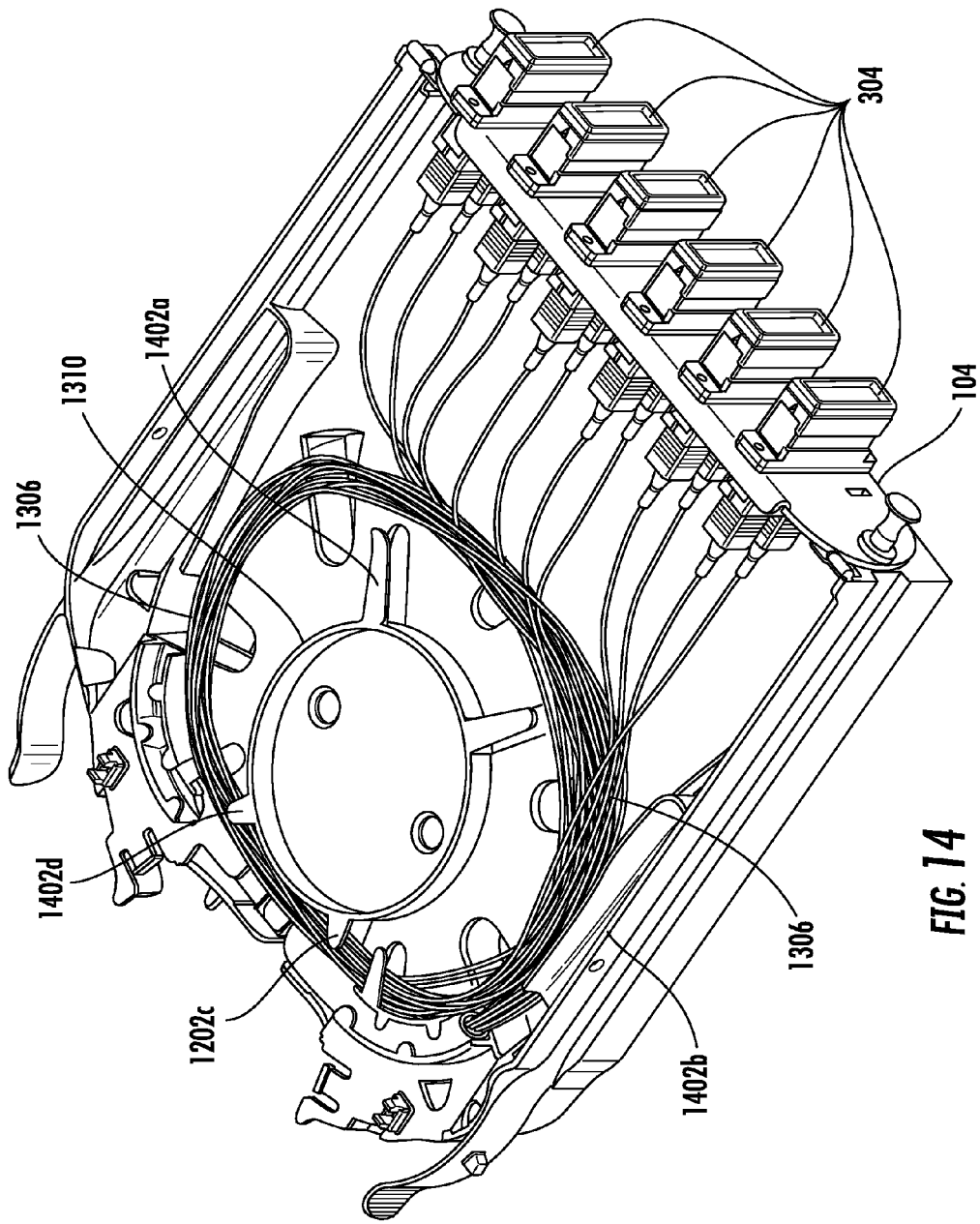
FIG. 14 depicts the pigtail storage layer with the cover and hinged separator removed, further illustrating radius limiting securing mechanisms.

FIG. 14 depicts the pigtail storage layer 208, further illustrating radius limiting securing mechanisms 1402*a*-1402*d*. As illustrated, the optical fibers 1306 may be received from the splice storage layer and routed around a pigtail storage area and then to a pigtail connection area for connecting with the adapters 304. Additionally, the radius limiting hub 1310 may be configured to limit a winding radius of the optical fibers. Accordingly, the radius limiting hub 1310 may also include the radius limiting securing mechanisms 1402*a*-1402*d* that restrict movement of the optical fibers 1306, when the adapter plate 104 is removed.

Figure 15:
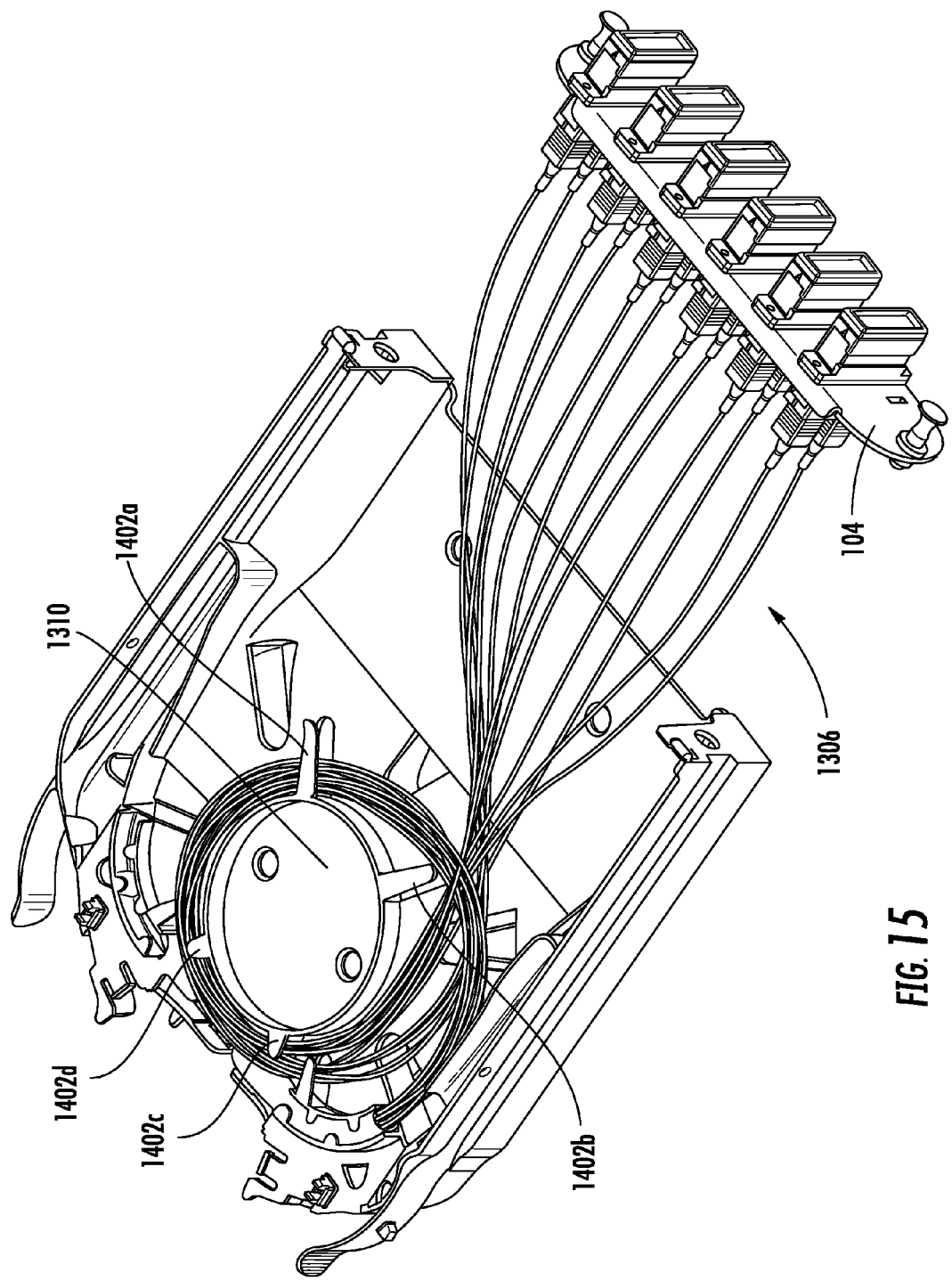
FIG. 15 depicts a portion of the pigtail storage layer, further illustrating removal of the adapter plate.

FIG. 15 depicts the pigtail storage layer 208, further illustrating removal of the adapter plate 104 from the front. As illustrated, upon removal of the adapter plate 104, the optical fibers 1306 are straightened, thereby removing slack from the pigtail storage area. As such, the radius limiting hub 1310 and the radius limiting securing mechanisms 1402*a*-1402*d* prevent the optical fibers 1306 from damage by limiting the radius of winding.

Figure 16:
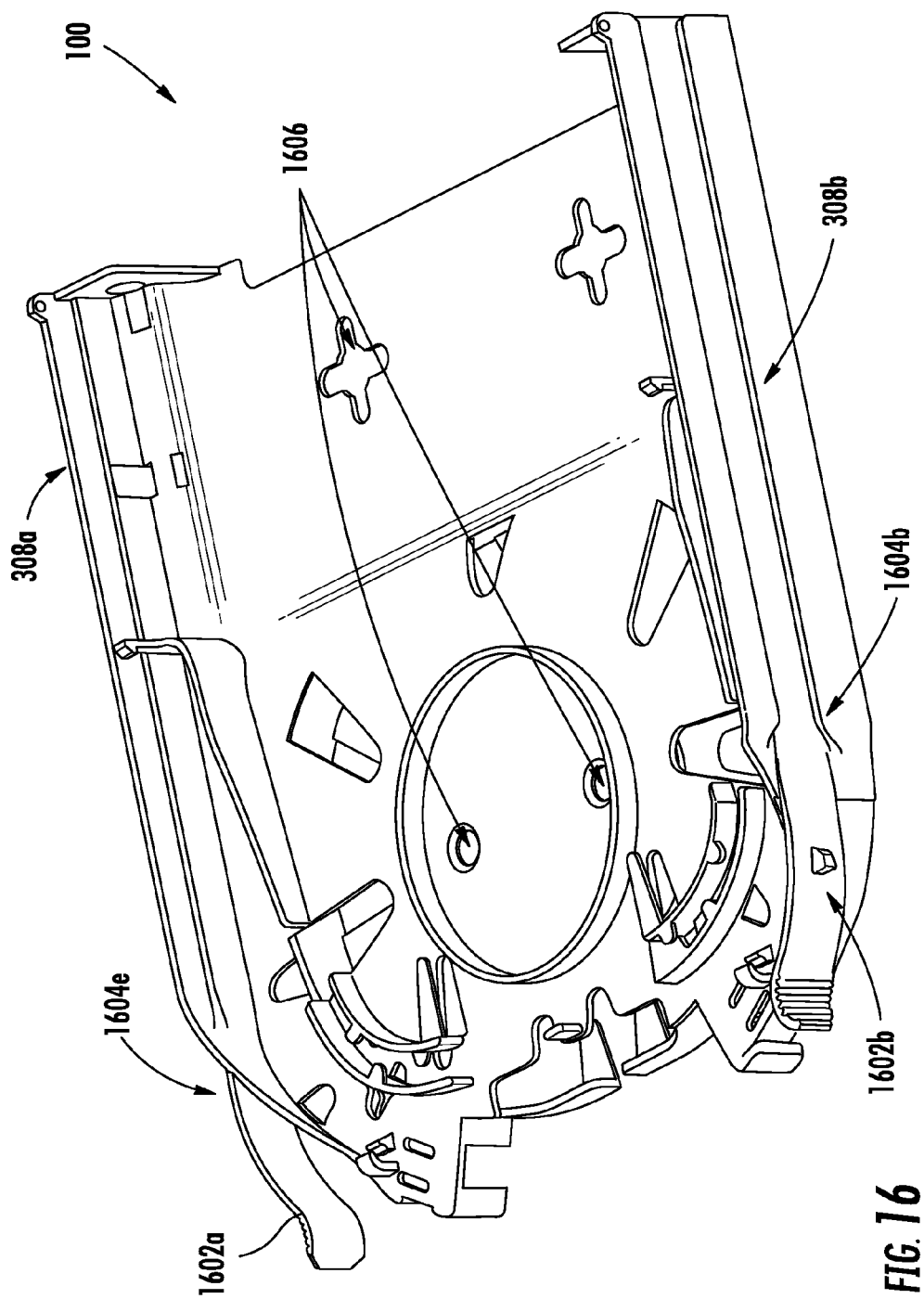
FIG. 16 depicts the portion of the multi-layer splice module, further illustrating the mounting tracks on the sides.

FIG. 16 depicts the portion of the multi-layer module 100, further illustrating the mounting tracks 308*a*, 308*b*, according to embodiments disclosed herein. As illustrated, the mounting tracks 308*a*, 308*b* may engage with a telecommunications housing or the like for securing the multi-fiber splice module 100 therein. Additionally, the mounting tracks 308*a*, 308*b* may include a plurality of respective securing latches 1604*a*, 1604*b* for securing the multi-layer module 100 in place. Pull tabs 1602*a*, 1602*b* may also be included for removing the multi-layer module 100 from the telecommunications rack. Also included are wall mounting openings 1606 for mounting the multi-layer module 100 to a wall or other structure.

Figure 17:
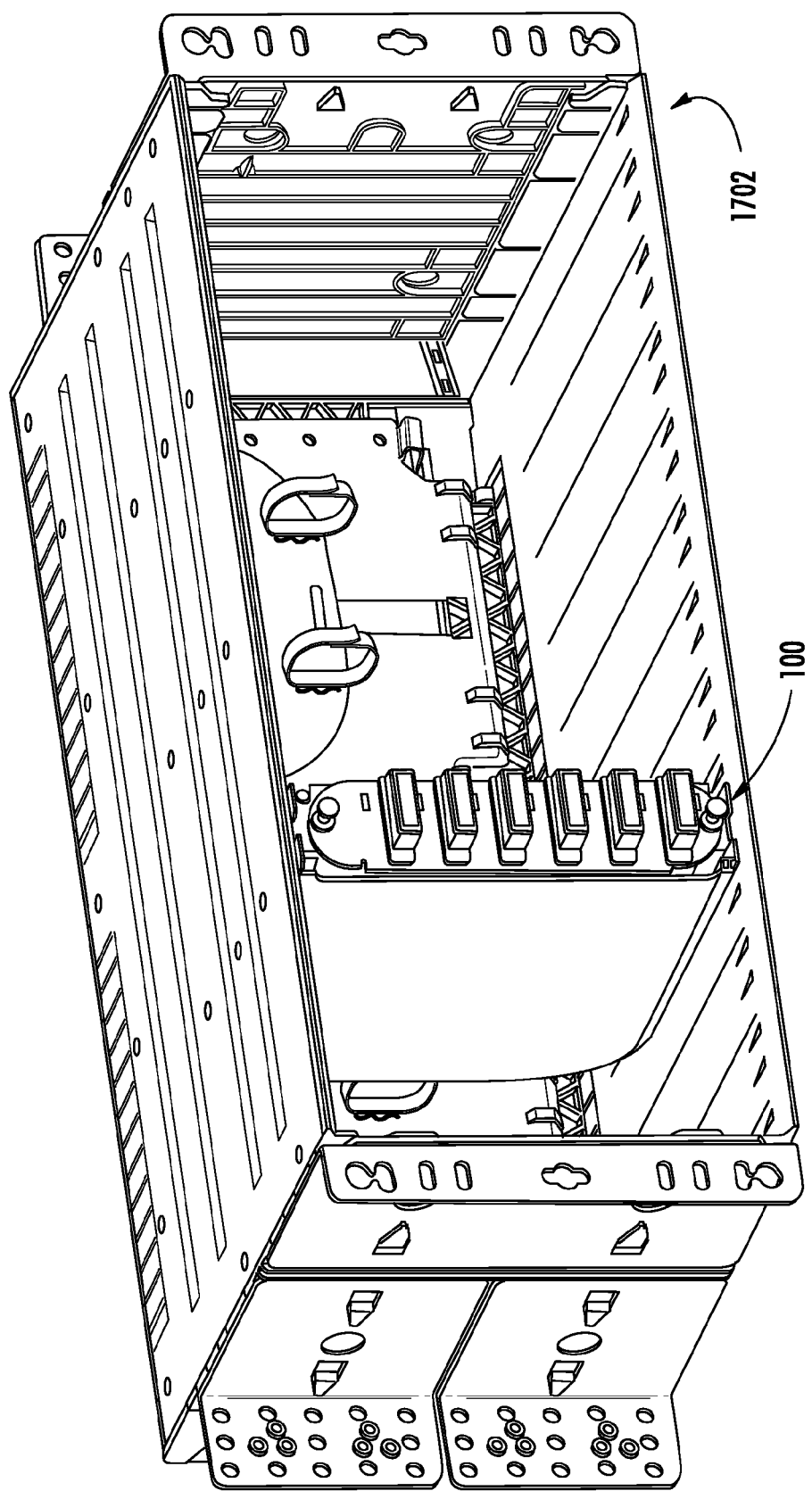
FIG. 17 depicts a perspective environmental view of a telecommunications housing for receiving multi-layer splice modules therein.

FIG. 17 depicts an optical cable system that includes telecommunications housing 1702 for inserting the multi-layer module 100 into an opening on a front side of the telecommunications housing 1702. As illustrated, the mounting tracks 308a, 308b may engage with a corresponding portion of the telecommunications housing 1702 to removably secure the multi-layer module 100. More specifically, the telecommunications housing 1702 may be configured with corresponding tracks to engage with the mounting tracks 302a, 308b for a removably secure configuration. As described above, the multi-layer module 100 may be removed via depressing the pull tabs 1602a, 1602b (FIG. 16). Although telecommunications housing 1702 is illustrated in FIG. 17, other module receiving devices may also be utilized for removably securing the multi-layer splice module and/or at least one other mountable modules in a stackable fashion, where a pair of major faces from the rack mountable optical module is physically disposed against a major face from the at least one other rack mountable module. Module 100 is also advantageous since it has the flexibility for other mounting arrangements. By way of example, module 100 may be secured directly to a mounting surface using fasteners through the cross-shaped openings shown (not numbered) in FIG. 16. This mounting flexibility along with having multi cable entry locations at the front and/or rear allows the craft to use modules disclosed herein in a multitude of arrangement; rather, than being limited in mounting arrangement and/or cable entry as with conventional modules.

For purposes of describing and defining the invention, the phrase "rack mountable optical module" is used herein to identify a fiber-optic module that is configured for removable mounting in a telecommunications rack and defines open or closed stackable major faces that are amenable to relatively compact side-by-side alignment with similar modules within the rack. It should be understood that a "rack mountable optical module" is not to be confused with an outside-rated, stand-alone closure that is provided with a relatively bulky exterior housing designed with exterior-rated moisture seals to withstand the elements for an extended period of outdoor use.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A splice holder, comprising:
  a base portion; and
  an array of splice holding partitions extending from the base portion, wherein:
    the array of splice holding partitions define a plurality of rows for receiving a respective first splice component along a first direction and a plurality of columns intersecting the plurality of rows for receiving a second splice component along a second direction,
    selected pairs of splice holding partitions define a column width,
    selected pairs of splice holding partitions define a row width, and
    the column width is sufficiently greater than the row width to accommodate the second splice component oriented along one of the plurality of columns that could not otherwise be accommodated if oriented along one of the plurality of rows.

2. The splice holder of claim 1, wherein individual splice holding partitions positioned at an intersection of a row and a column comprise:
  a row-forming surface portion that opposes a complementary row-forming surface portion of an adjacent splice holding partition; and
  a column-forming surface portion that opposes a complementary column-forming surface portion of an adjacent splice holding partition.

3. The splice holder of claim 1, wherein at least some of the splice holding partitions are tapered to define at least one of the following: a variable column width and a variable row width, that increases along a direction in which the splice holding partitions extend from the base portion.

4. The splice holder of claim 1, wherein the array of splice holding partitions are individually connected to the base portion.

5. The splice holder of claim 1, wherein the array of splice holding partitions has a length such that the array of splice holding partitions can removably secure two mass fusion splice components that are stacked in the direction of the length.

6. The splice holder of claim 1, wherein a plurality of individual splice holding partitions cooperate with the base portion and adjacent splice holding partitions to define splice component seats that extend from the plurality of individual splice holding partitions across a row and across a column.

7. The splice holder of claim 1, wherein:
  at least some of the splice holding partitions cooperate with the base portion and an adjacent splice holding partition to define a first splice component seat extending across a row and defining a first radius of curvature configured to complement an outside diameter of a first splice component; and
  at least some of the splice holding partitions cooperate with the base portion and an adjacent splice holding partition to define a second splice component seat extending across a column and defining a second radius of curvature configured to complement an outside diameter of the second splice component.

8. The splice holder of claim 1, wherein the splice holder has at least one splice component stored therein.

9. The splice holder of claim 1, wherein a plurality of fiber splice components or mass fusion splice components are oriented exclusively along either the plurality of rows or the plurality of columns of the splice holder.

10. The splice holder of claim 1, wherein a subset of the splice holding partitions are arranged to define a transition box area for receiving and removably securing a transition box, wherein selected pairs of the subset of the splice holding partitions comprise opposing surface portions that define a transition box area width that is larger than the column width.

11. The splice holder of claim 1, wherein a subset of the splice holding partitions are arranged to define a mass fusion area for receiving and removably securing a mass fusion splice component, wherein selected pairs of the subset of the splice holding partitions comprise opposing surface portions that define a mass fusion area width that is larger than the mass fusion column width.

12. The splice holder of claim 1, wherein the base portion comprises a plurality of anchor tabs that extend from the base portion, the plurality of anchor tabs for removably securing the splice holder to a splice module by extending through a layer of the splice module.

13. The splice holder of claim 1, wherein the base portion comprises a plurality of extension tabs that extend from a perimeter of the base portion, the plurality of extension tabs for removably securing the splice holder to a splice module.

14. The splice holder of claim 1, wherein the splice holder comprises at least one of the following for securing a fiber splice component: a notch formed on at least a portion of the array of splice holding partitions, a cover on at least a portion of the splice holder, and a clip that connects adjacent splice holding partitions.

15. The splice holder of claim 1, wherein at least a portion of the splice holder is constructed of a pliable rubber material.

16. The splice holder of claim 1, wherein the splice holder has one of the following shapes: square, rectangular, and polygonal.

17. A module, comprising:
a housing that includes a splice storage layer; and
a splice holder that is removably coupled to the splice storage layer, the splice holder comprising:
  a base portion; and
  an array of splice holding partitions extending from the base portion, wherein:
    the array of splice holding partitions define a plurality of rows for receiving a respective first splice component along a first direction and a plurality of columns intersecting the plurality of rows for receiving a second splice component along a second direction,
    selected pairs of splice holding partitions define a column width,
    additional pairs of splice holding partitions define a width, and
    the column width is sufficiently greater than the row width to accommodate the second splice component oriented along one of the plurality of columns that could not otherwise be accommodated if oriented along one of the plurality of rows.

18. The module of claim 17, wherein the module comprises a multi-fiber cable storage layer, the splice storage layer, and a pigtail storage layer, the multi-fiber cable storage layer comprising a cable entry opening for receiving a multi-fiber cable, the splice storage layer comprising a splice layer receiving opening that receives at least a portion of the multi-fiber cable from the multi-fiber cable storage layer, and the pigtail storage layer comprising a pigtail storage layer receiving opening that receives an optical fiber from the splice storage layer.

19. A splice holder seated in a fiber optic splice tray comprising optical fiber routing hardware, the splice holder comprising:
a base portion; and
an array of splice holding partitions extending from the base portion, wherein:
  the array of splice holding partitions define a plurality of rows for receiving a respective first fiber splice component along a first splicing direction and a plurality of columns intersecting the plurality of rows for receiving a second splice component along a second splicing direction,
  selected pairs of splice holding partitions define a column width,
  additional pairs of splice holding partitions define a row width, and
  the column width is sufficiently greater than the row width to accommodate the second splice component oriented along one of the plurality of columns that could not otherwise be accommodated if oriented along one of the plurality of rows.

20. The splice holder of claim 19, wherein individual splice holding partitions positioned at an intersection of a row and a column comprise:
a row-forming surface portion that opposes a complementary row-forming surface portion of an adjacent splice holding partition; and
a column-forming surface portion that opposes a complementary column-forming surface portion of an adjacent splice holding partition.

21. The splice holder of claim 19, wherein at least some of the splice holding partitions are tapered to define at least one of the following: a variable column width and a variable row width, that increases along a direction in which the splice holding partitions extend from the base portion.

22. The splice holder of claim 19, wherein the array of splice holding partitions are individually connected to the base portion.

23. The splice holder of claim 19, wherein the array of splice holding partitions has a length such that the array of splice holding partitions can removably secure two mass fusion splice components that are stacked in the direction of the length.

* * * * *